F. A. THORNTON.
AERIAL MACHINE.
APPLICATION FILED APR. 19, 1917.

1,259,804. Patented Mar. 19, 1918.

Inventor,
Francis A. Thornton.
By Bakewell Church Attys.

UNITED STATES PATENT OFFICE.

FRANCIS A. THORNTON, OF RICHMOND HEIGHTS, MISSOURI.

AERIAL MACHINE.

1,259,804.

Specification of Letters Patent. Patented Mar. 19, 1918.

Application filed April 19, 1917. Serial No. 163,206.

*To all whom it may concern:*

Be it known that I, FRANCIS A. THORNTON, a citizen of the United States, residing at Richmond Heights, Missouri, have invented a certain new and useful Improvement in Aerial Machines, of which the following is a full, clear, and exact description, such as will enable others skilled in the art to which it appertains to make and use the same.

This invention relates to aerial machines, and particularly to air ships or dirigible balloons of the so-called "rigid" type, in which the gas bag or aerostat is combined with a rigid frame so as to produce a substantially rigid supporting element that will maintain its shape when the machine is traveling through the air.

The main object of my invention is to provide an air ship of novel construction that is capable of attaining great speed and which can be controlled and guided accurately.

Another object is to provide a combined aerostatic and aerodynamic aerial machine of novel construction.

To this end I have devised an aerial machine in which the aerostat or supporting element consists of an elongated object of rigid, or substantially rigid, construction provided with flat under and upper surfaces and having tapered ends and longitudinal side edges that preferably have a slight curvature. Propellers are arranged adjacent the bow and stern of the ship as near as practicable to the axis of the greatest air resistance in the machine's forward movement through the air, and while it is immaterial, so far as my broad idea is concerned, what means is used to drive the propellers, I prefer to use two batteries of aero motors arranged in proximity to the propellers, so that the propellers can be connected up directly with the crank shafts of the motors. An airship of the construction above described can be used either as an aerostatic machine or as an aerodynamic machine on account of the fact that the aerostat is provided with a substantially flat bottom surface or underside of such form that it will serve as an aeroplane surface. Furthermore, such a machine has great lifting power and is capable of attaining great speed on account of the peculiar shape of the aerostat. If desired, detachable aeroplane wings can be arranged at opposite sides of the aerostat, thus producing an aerodynamic machine provided with a flat, elongated aerostat having curved ends and edges and arranged between aeroplane wings that project laterally from the sides of same.

Figure 1 of the drawings is a side elevational view of an aerial machine constructed in accordance with my invention, showing the aeroplane wings connected to the aerostat.

Figure 1:
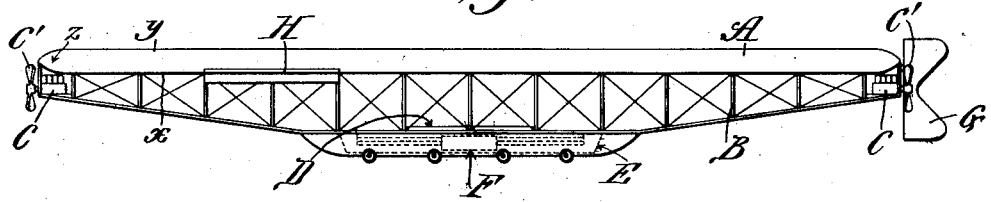
Figure 2:
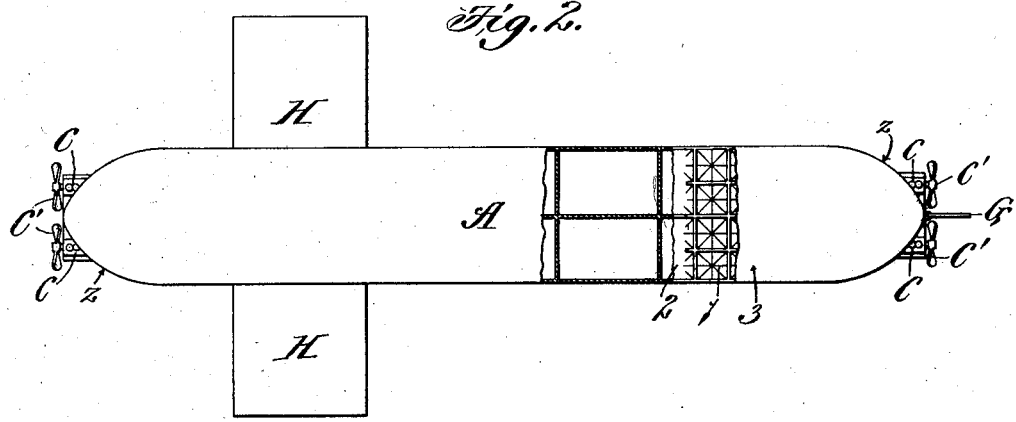
Fig. 2 is a top plan view, partly broken away, to show the interior construction of the aerostat.
Figure 3:
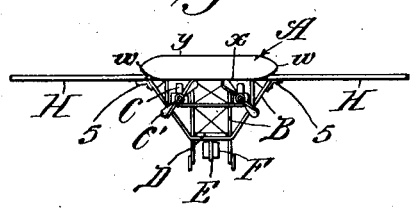
Fig. 3 is a front elevational view of the machine.
Figure 4:
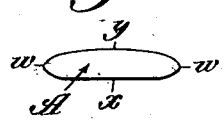
Fig. 4 is an end view of an aerostat of slightly different form from the one shown in Fig. 3.
Figure 5:
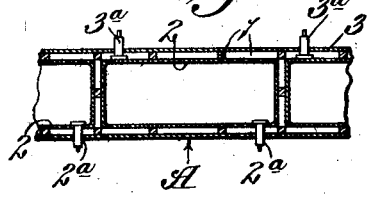
Fig. 5 is a fragmentary, longitudinal sectional view of the aerostat.
Figure 6:
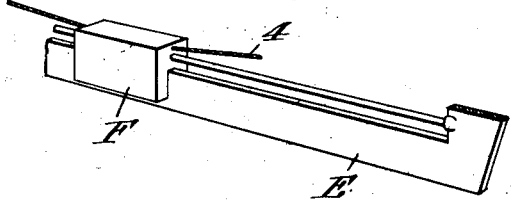
Fig. 6 is a perspective view of a portion of the keel and the shiftable controlling element mounted on same.

Referring to the drawings which illustrate the preferred form of my invention, A designates the aerostat or supporting element of the machine which consists of a substantially flat, elongated object of rigid construction provided with tapered ends and tapered longitudinal side edges whose outer surfaces are curved. The depth of the aerostat is considerably less than the breadth of the aerostat, so that the aerostat will offer the least possible head resistance to the wind and also the least possible resistance to transverse air currents. The specific proportions of the aerostat are immaterial, so far as my broad idea is concerned, but it is essential that the depth or thickness of the aerostat be as small as possible consistent with the desired buoyancy. The underside $x$ of the aerostat A, is flat, or substantially flat, and the upper side $y$ is also flat. The ends $z$ are tapered both longitudinally and transversely on curved lines, as shown in Figs. 1 and 2, and the longitudinal side edges $w$ of the aerostat are made slightly tapered and also curved, as shown in Fig. 3. I have not herein claimed the aerostat *per se*, as the same forms the subject-matter of my pending application for patent Serial No. 204,054, filed November 26, 1917.

The particular details of construction of the aerostat A are immaterial, but it is essential that it be of rigid, or of substantially rigid, construction, so that it will maintain its shape when it is traveling through the air. In the embodiment of my invention herein illustrated the aerostat is provided with a rigid frame 1 of skeleton construction built as a single unit and combined with a number of gas containers or compartments 2 formed of fabric and filled with hydrogen or other lighter than air gas, thus producing a rigid aerostat that is divided into a number of separate gas compartments. The frame 1 is covered with an outer shell or envelop 3 of fabric which is of such a character that the underside of the aerostat will act as an aeroplane surface. Each of the gas containers 2 is provided with a filling tube $2^a$ or inlet opening through which hydrogen or other lighter than air gas can be introduced into same, and the outer shell or envelop 3 is provided with a number of filling tubes $3^a$ through which air can be introduced into the envelop so as to collapse the gas containers 2.

A rigid under structure B is suspended from the aerostat A, so as to form a support for the motors C, the car D in which the occupants are located, the fuel, instruments, etc., said under structure B being of any preferred design and rigidly connected to the frame 1 of the aerostat, so as to form one unit or integral structure. In the form of my invention herein shown the under structure B consists of a rigid frame of skeleton construction provided with a keel E on which a shiftable controlling element F, such, for example, as a weight, is mounted, said shiftable controlling element F being adapted to be moved longitudinally of the keel by means of a rope or other device 4 under control of the operator. The stability of the machine and path of travel of same can be controlled by the weight F on the keel and by a vertically-disposed rudder G located at the stern of the machine. If desired, elevating planes (not shown) can be arranged at the stern or other desired place on the machine. The motors arranged at the bow and at the stern of the machine are provided with propellers C' of any preferred design which are preferably connected directly to the crank shafts of the motors. It is not essential, however, that the propellers be arranged in the particular manner herein shown, as they could be arranged in various other ways and also operated in other ways without departing from the spirit of my invention.

The aerostat A can either be so proportioned and designed that it will impart sufficient buoyancy to the machine to float it in the stratum of the air just above the earth's surface, or it can be so designed that the machine will be just a little heavier than the air, thus causing the machine to gradually sink to the ground when it is not in motion. An aerial machine of the construction above described can be used either as an aerostatic or aerodynamic machine. When it is used as an aerodynamic machine it is preferable to arrange detachable aeroplane wings H at opposite sides of the aerostat A, said aeroplane wings being of any preferred construction and rigidly connected to the frame 1 of the aerostat in such a manner that they can be easily disconnected from same when it is desired to use the machine as an aerostatic machine. Any suitable means can be used for detachably connecting the aeroplane wings H to the frame 1, the means herein shown consisting of bolts 5, as illustrated in Fig. 3. An air ship of the construction above described has great lifting power and is capable of attaining great speed, on account of the shape or form of the aerostat and the novel arrangement of the propellers, the aerostat being of such form that it offers the least possible resistance to the wind and the propellers being so arranged that they form a pulling unit at the bow of the ship and a pushing unit at the stern of the ship, both of which are located near to the axis of the greatest air resistance in the ship's forward movement. In view of the fact that the aerostat is very shallow or of considerably less depth than its breadth, it offers little resistance to transverse air currents. Consequently, the machine can be guided or controlled more accurately than is possible with an air ship equipped with an aerostat whose depth is equal to, or substantially equal to, its breadth.

Having thus described my invention, what I claim, and desire to secure by Letters Patent, is:

1. An aerial machine provided with an aerostat of rigid, or substantially rigid, construction whose depth is considerably less than its breadth, a structure of skeleton form depending from said aerostat, motors mounted on said structure adjacent the opposite ends of the aerostat and equipped with propellers, a car for the occupants carried by said structure, and a keel on said structure provided with a shiftable controlling member.

2. An aerial machine provided with an elongated aerostat having flat under and upper surfaces and ends that are tapered slightly on curved lines, and detachable aeroplane wings projecting laterally in opposite directions from the sides of said aerostat.

3. An aerostat for aerial machines, consisting of a relatively long and narrow object having flat under and upper surfaces and tapered ends and side edges whose outer surfaces are curved, said object being composed of a rigid frame, a number of separate compartments that are filled with hydrogen or other lighter than air gas, and an exterior envelop surrounding said compartments and adapted to be filled with air or some inert gas.

4. An aerostat for aerial machines which in outline resembles a flat, elongated object provided with pointed ends, said aerostat being composed of a rigid frame, a plurality of compartments adapted to contain hydrogen or other lighter than air gas, an outer shell or envelop of fabric that incloses said compartments and which is adapted to be filled with air or some inert gas, means for enabling said compartments to be filled independently of one another, and a vent for said outer envelop.

FRANCIS A. THORNTON.